United States Patent
Elwart et al.

(10) Patent No.: US 10,293,816 B2
(45) Date of Patent: May 21, 2019

(54) AUTOMATIC PARK AND REMINDER SYSTEM AND METHOD OF USE

(71) Applicant: Ford Global Technologies, LLC, Dearborn, MI (US)

(72) Inventors: Shane Elwart, Ypsilanti, MI (US); Sudipto Aich, Palo Alto, CA (US)

(73) Assignee: Ford Global Technologies, LLC, Dearborn, MI (US)

(*) Notice: Subject to any disclaimer, the term of this patent is extended or adjusted under 35 U.S.C. 154(b) by 550 days.

(21) Appl. No.: 14/482,307

(22) Filed: Sep. 10, 2014

(65) Prior Publication Data

US 2016/0068158 A1    Mar. 10, 2016

(51) Int. Cl.

| | |
|---|---|
| *B60W 30/06* | (2006.01) |
| *B60W 10/00* | (2006.01) |
| *B60W 10/20* | (2006.01) |
| *B60W 50/10* | (2012.01) |
| *B62D 15/02* | (2006.01) |
| *B60W 50/00* | (2006.01) |

(52) U.S. Cl.
CPC ............ *B60W 30/06* (2013.01); *B60W 10/00* (2013.01); *B60W 10/20* (2013.01); *B60W 50/10* (2013.01); *B62D 15/0285* (2013.01); *B60W 2050/0089* (2013.01); *B60W 2050/0095* (2013.01); *B60W 2520/10* (2013.01); *B60W 2530/14* (2013.01); *B60W 2540/04* (2013.01); *B60W 2540/30* (2013.01); *B60W 2720/103* (2013.01)

(58) Field of Classification Search
CPC ...... B60R 25/10; G06Q 50/30; G08G 1/0967; G06F 17/00; B60Q 1/48; B60Q 1/00; H04M 3/42
See application file for complete search history.

(56) References Cited

U.S. PATENT DOCUMENTS

| | | | |
|---|---|---|---|
| 7,005,974 B2* | 2/2006 | McMahon | B60Q 9/005 248/200 |
| 2009/0157260 A1 | 6/2009 | Lee | |
| 2010/0041378 A1* | 2/2010 | Aceves | H04L 67/306 455/414.1 |
| 2011/0080304 A1* | 4/2011 | Toledo | B62D 15/027 340/932.2 |
| 2012/0143468 A1 | 6/2012 | Kim et al. | |
| 2014/0074352 A1* | 3/2014 | Tate, Jr. | B62D 15/028 701/36 |

(Continued)

FOREIGN PATENT DOCUMENTS

CN        202923502        5/2013

*Primary Examiner* — Thomas E Worden
(74) *Attorney, Agent, or Firm* — Frank A. MacKenzie; Burgess Law Office, PLLC

(57) ABSTRACT

A parking system adaptively controlling a vehicle during a parking maneuver using a park assist system, for example an active park assist (APA) or trailer backup assist (TBA). Control of the park assist system based on previous speed profiles at a geographic location where the same park assist system was previously activated. The parking system including an activation system that, based on vehicle speed and geographic location, activates the park assist system when preconditions for park assist system operation are met. The activation system may cooperate with the park assist system based on default or previously stored drive history profiles associated with the current geographic location.

18 Claims, 9 Drawing Sheets

(56) References Cited

U.S. PATENT DOCUMENTS

2014/0303839 A1* 10/2014 Filev .................... G06F 3/0481
                                                          701/36
2014/0310075 A1* 10/2014 Ricci .................... H04W 48/04
                                                          705/13
2014/0375476 A1* 12/2014 Johnson ................ G08G 1/143
                                                          340/932.2

* cited by examiner

AUTOMATIC PARK AND REMINDER SYSTEM AND METHOD OF USE

CROSS-REFERENCE TO RELATED APPLICATIONS

Not Applicable.

BACKGROUND OF THE INVENTION

1. Field of the Invention

The present invention relates generally to a park assist system and, more particularly, to an automatic parking system that learns and stores previous locations.

2. Description of Related Art

Automatic parking systems such as active park assist or trailer backup assist are very helpful during parking maneuvers to successfully park a vehicle in a desired parking space.

A system user or driver must first remember that such systems exist. Drivers often forget the existence of these systems and manually park their vehicle instead of using the convenience of the automatic parking system, even when the driver had previously used the system to park in a current location.

Even though a driver remembers to enable or activate the automatic parking system to automatically control steering during a parking maneuver at a desired parking location, typically the driver must still manually control the vehicle speed during the parking maneuver. When returning to the same location the driver may want to recreate the previous speed profile used to park the vehicle. However, manual recreation of a previous speed profile during a parking maneuver is nearly impossible to replicate.

Similarly, if a driver performs a backup maneuver using a trailer backup assist system at a specific location and manually alters the curvature of the path of the trailer during the backup maneuver, recreation of the altered path is nearly impossible to replicate.

SUMMARY OF THE INVENTION

One embodiment of the present invention includes a system and method of automatically enabling, activating and adaptively controlling a parking assist system on a vehicle based on a drive history profile associated with a geographic location.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings.

DETAILED DESCRIPTION OF THE PREFERRED EMBODIMENTS

The following description of the preferred embodiment(s) is merely exemplary in nature and is in no way intended to limit the invention, its application, or uses.

One embodiment of the present invention includes a vehicle having an automatic parking system. The automatic parking system includes a park assist system and an activation system that enables the park assist system based on vehicle speed and geographic location. An automatic parking system includes automatic or semi-automatic parking systems, such as an active park assist system as well as a trailer-backup assist system that automatically or semi-automatically maneuvers a vehicle to park in a desired parking space.

The activation system activates the park assist system when preconditions for activating the system are met whereby the park assist system adaptively controls the vehicle based on default or previously stored drive history profiles associated with the geographic location. In one example, the activation system activates the park assist system upon recognizing that the vehicle in a particular geographic location thereby eliminating the need for the driver to preselect or engage park assist system. In this manner the vehicle begins scanning the road in advance in preparation of a parking maneuver.

Upon meeting preconditions at a recognized geographic location the system guides the vehicle through the parking procedure. The preconditions may include a previous drive history profile that includes a speed profile for an active park assist system, or a speed profile and trailer backup steering profile for a trailer backup assist system. The system controls the vehicle based on the previous drive history profile, or a modified drive history profile that deviates from the previous drive history profile when a driver overrides the parameters used to create the previous drive history profile during a parking event.

Another embodiment of the invention includes a method whereby the system guides a vehicle through the parking process at an unrecognized geographic location where a park assist system has not been previously used. The method includes creating a default drive history profile that includes a default speed profile for the park assist system for an active park assist system or a default speed profile and a default trailer backup steering profile for a trailer backup assist system. During parking the park assist system controls the vehicle based on either a default drive history profile or a modified drive history profile that deviates from the default drive history profile when a driver overrides the parameters used to create the default drive history profile during a parking event.

Figure 1:
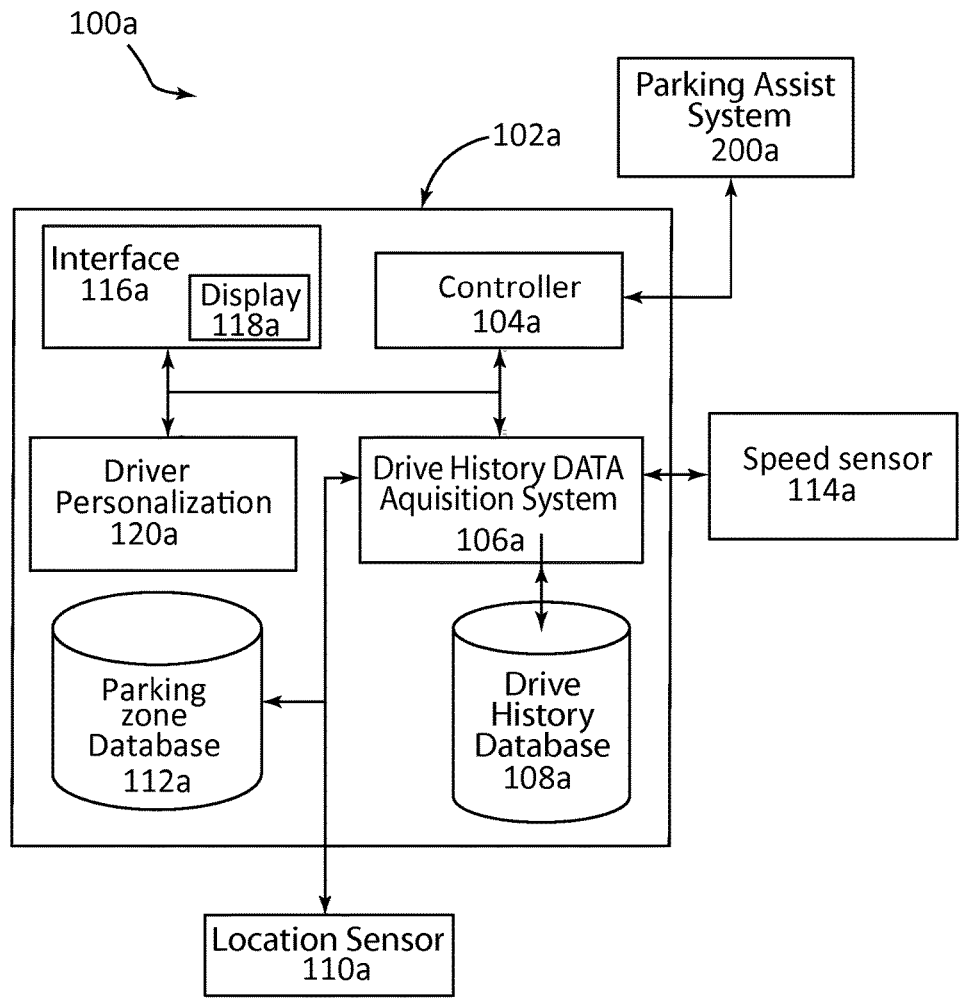
FIG. 1 is a system block diagram of an automatic parking system including an activation system in communication with the park assist system in accordance with an embodiment of the invention.

FIG. 1 is a schematic of an automatic parking system 100a, for example, an active park assist system or a trailer back up assist system used to assist a driver, including an activation system 102a. The automatic parking system 100a includes a park assist system 200a. The park assist system 200a may have several different embodiments depending on the configuration of the park assist system implemented on a vehicle as discussed in more detail with reference to FIGS. 3-4.

The park assist system 200c shown in FIG. 3, and discussed in further detail below, is used for exemplary purposes to illustrate use of the activation system 102a in combination with any park assist system that may be adaptively controlled by the activation system 102a to control a vehicle's speed during a parking maneuver based on a current or previous drive history profile associated with a particular location.

Figure 4:
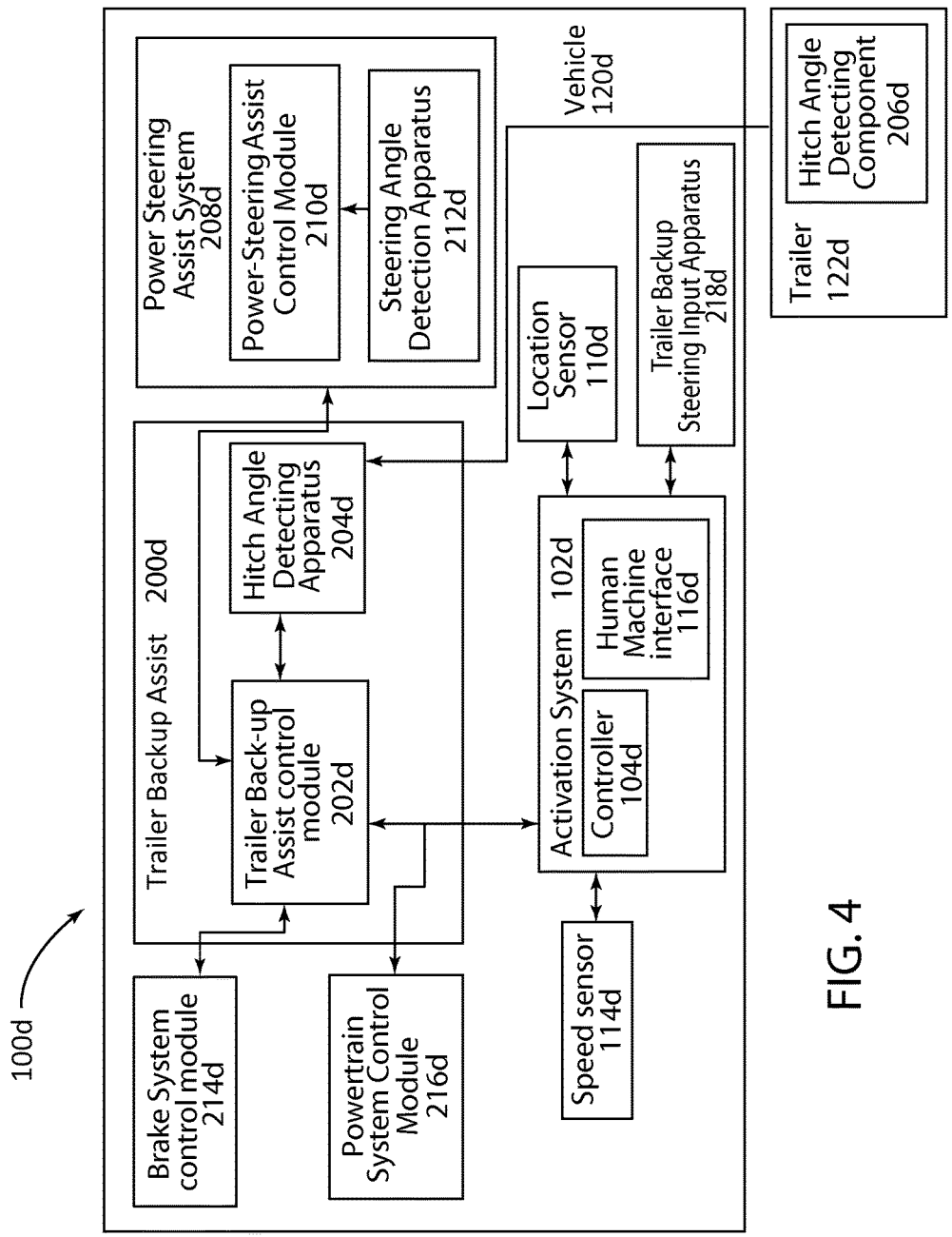
FIG. 4 is a schematic diagram of a vehicle including an automatic parking system having an activation system in communication with a trailer backup assist system.

Similarly, the trailer backup assist system 200d as shown in FIG. 4, and discussed in further detail below, is used for exemplary purposes only to illustrate use of the activation system 102a in combination with any trailer backup system that may be adaptively controlled by the activation system 102a to control a vehicle's speed and trailer backup steering control during a parking maneuver based on a current or previous drive history profile associated with a particular location.

In addition to basing the parking maneuver on a current or previous drive history profile, the system may also use profiles from other automated parking or trailer backup steering maneuvers obtained from multiple vehicles for the same location. The system may poll the parking or trailer backup profiles from multiple vehicles, gather the data, and use the data to create and optimize controller strategy and create an optimized path. In addition, the data obtained from multiple vehicles may also include objects detected during a particular maneuver that can be recorded and stored as part of the optimized path. In one example, the detected objects are logged and included as part of the profile whereby the optimized path for that particular geographic location recognizes the need to avoid the particular object.

Figure 3:
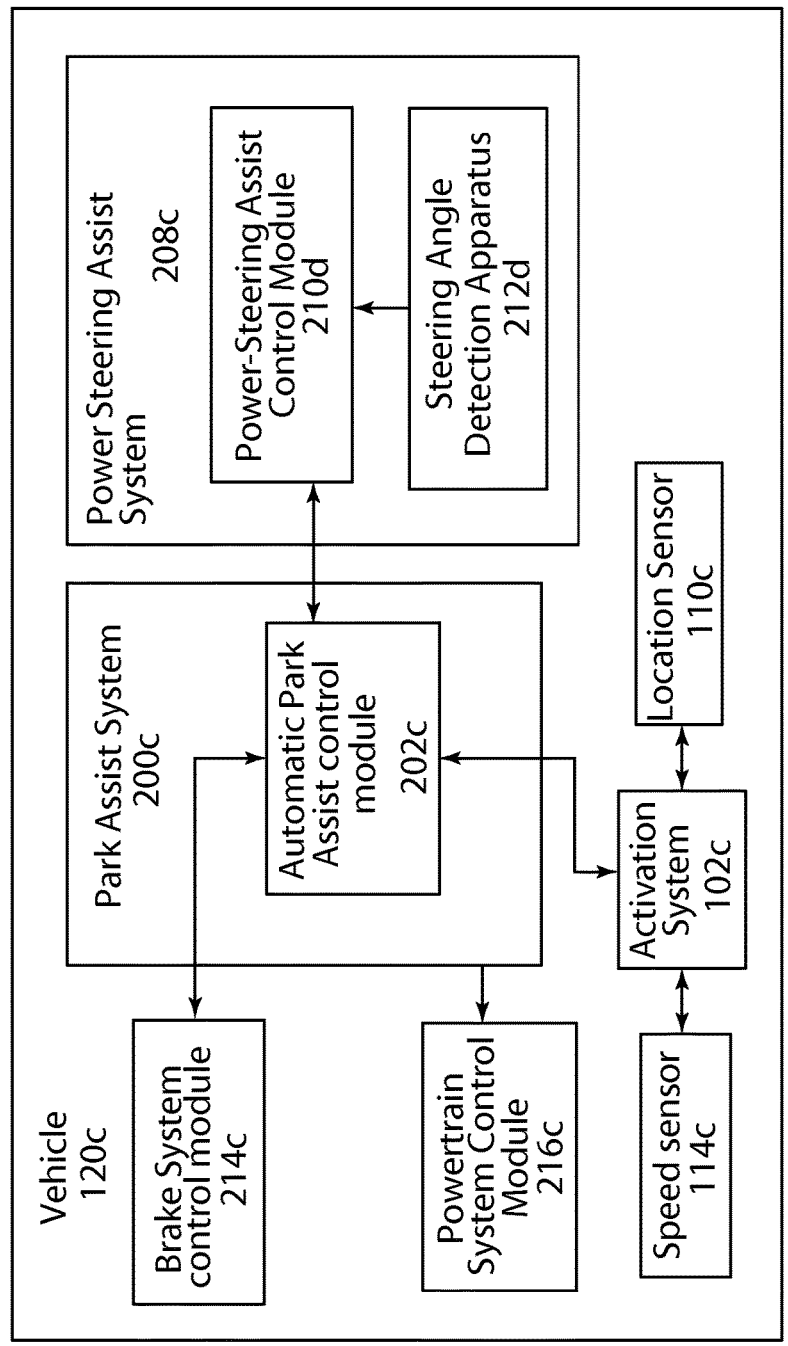
FIG. 3 is a schematic diagram of a vehicle including an automatic parking system having an activation system in communication with the park assist system.

Other active park assist and trailer backup assist systems that have less or more components than those disclosed in FIGS. 3-4 may be employed.

Referring to FIG. 1, the activation system 102a includes a controller 104a, a drive history data acquisition system 106a that receives inputs from a location sensor 110a, for example a GPS system, a vehicle speed sensor 114a, a drive history database 108a, and a human machine interface 116a including a display 118a. In further embodiment, the assist activation system 102a includes a driver personalization module 120a and a parking zone database 112a.

Figure 2:
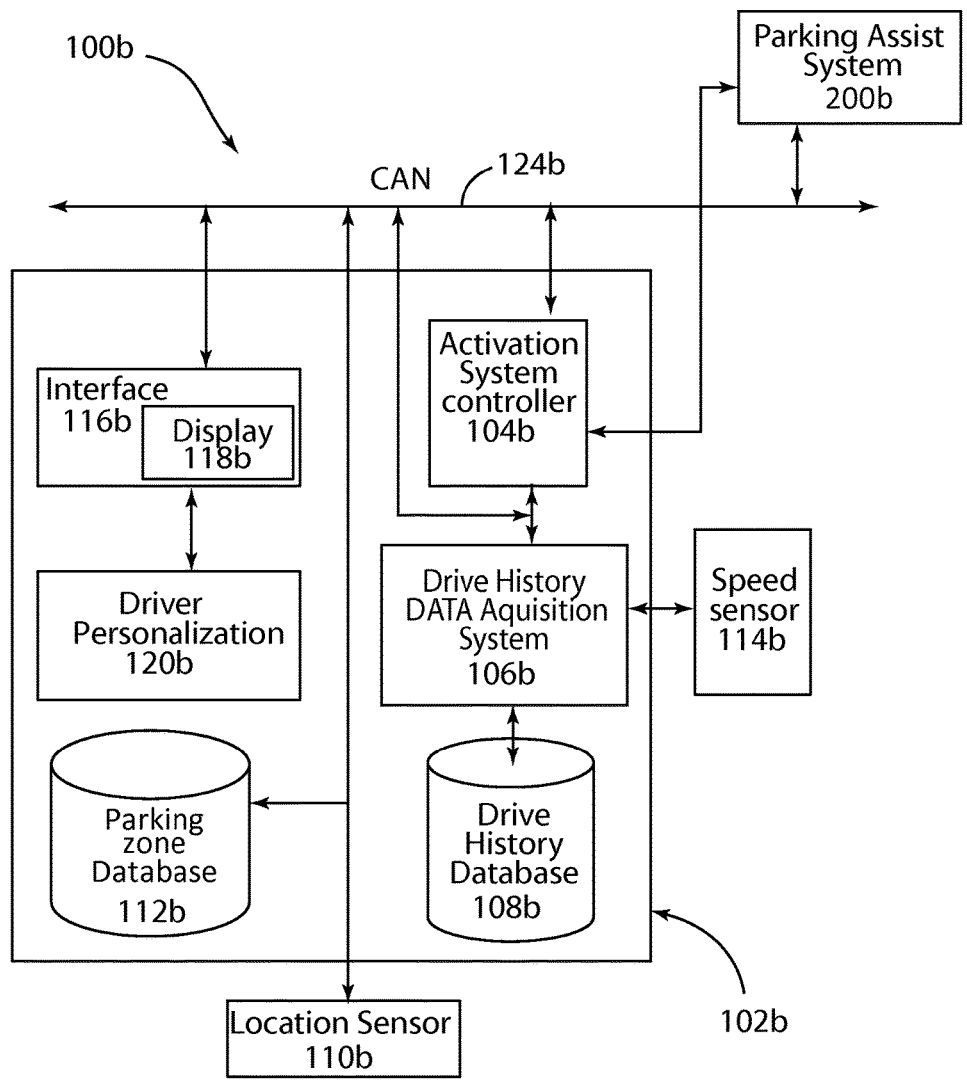
FIG. 2 is a system block diagram of an automatic parking system including an activation system connected to the vehicle electrical system via a vehicle controller area network.

As shown in FIGS. 1-2, the activation system 102a, 102b connects to the park assist system 200a, 200b allowing bidirectional communication. Reference numbers ending in "a" are shown in FIG. 1, and reference numbers ending in "b" are shown in FIG. 2. The activation system components and inputs are identical in FIG. 1 and FIG. 2, wherein FIG. 2 additionally includes a controller area network 124b as discussed in more detail below.

As illustrated in FIG. 2 each the components of the activation system 102b are in communication with a vehicle controller area network 124b. The controller area network 124b, or vehicle bus, enables communications between vehicle systems including, but not limited to engine management, body control, transmission control, steering control, power steering, braking control, and speed control. Since multiple controllers may be placed on the same bus, the controllers and modules in the activation system 102a, 102b and park assist system 200a, 200b are easily added to a conventional vehicle network. In addition, the components and controllers of the activation system 102a, 102b and park assist system 200a, 200b may communicate using wired or wireless networks and through any number of communication protocols; for example, radio frequency (RF), Bluetooth™, infrared (IrDA).

The activation system controller 104a, 104b accepts power from a motor vehicle battery and back-up battery (not shown). The controller 104a, 104b also has components including at least one microcomputer that performs computing and communications tasks necessary to control operation of the activation system 102a, 102b components and to enable the park assist system 200a, 200b, activate the park assist system 200a, 200b and control operation of the park assist system 200a, 200b during a parking maneuver.

Functionality and operation of the drive history data acquisition system 106a, 106b, and the drive history database 108a, 108b may be integrally incorporated into the activation system controller 104a, 104b. In one embodiment, the activation system controller 104a, 104b receives location and speed data from the location sensor 110a, 110b, and the speed sensor 114a, 114b via the drive history data acquisition system 106a, 106b. The activation system controller 104a, 104b receives operational parameters from the park assist system 200a, 200b, and enables the park assist system 200a, 200b based on vehicle location and speed data processed by and transmitted from drive history data acquisition system 106a, 106b to the activation system controller 104a, 104b. Once the park assist system 200a, 200b is enabled and the vehicle is at a desired and available parking space, the activation system controller 104a, 104b activates the park assist system 200a, 200b to park the vehicle when activation preconditions are met and subsequently receives drive history profile data from the drive history data acquisition system 106a, 106b to control the park assist 200a, 200b during a parking maneuver.

In an embodiment of the invention, the activation system controller 104a, 104b controls function of the drive history data acquisition system 106a, 106b to correlate each vehicle, driver, and parking zone related operational parameter to form a drive history profile and record the results in the drive history database 108a, 108b.

Referring to alternative embodiments, the activation system controller (e.g., the controller 104a, 104b discussed respectively above in reference to FIGS. 1 and 2) is integrated with the drive history data acquisition system 106a, 106b, and the drive history database 108a, 108b for carrying out activation system 102a, 102b functionality.

In an embodiment of the invention, the drive history data acquisition system 106a, 106b includes a data processor in operative electrical communication with the activation system controller 104a, 104b, and with a non-transitory computer readable device, shown in the embodiment in FIG. 1 as the drive history database 108a, 108b.

The drive history data acquisition system 106a, 106b monitors vehicle operational parameters before a parking event, collects and continuously records drive history data from the park assist system 200a, 200b during a parking event, and stores the recorded drive history data at the completion of a parking event as a drive history profile. If the driver has never modified a park assist system parking maneuver the drive history data is stored as a default drive history profile, or as a driver modified drive history profile, if the current DH profile modifies either the default drive history profile. In addition, the system stores the previous drive history profile.

In one embodiment, activation system 102a, 102b includes the drive history data acquisition system 106a, 106b and the drive history database 108a, 108b along with the activation system controller 104a, 104b. The drive history data acquisition system 106a, 106b may be a scalable and subservient device to the controller, and has a data processor that decodes and stores analog and digital inputs and drive history data from vehicle systems and sensors. The drive history may include data from vehicle speed sensors, vehicle location sensors, and park assist system data including brake system and accelerator functionality and trailer backup steering assist functionality. The drive history data acquisition system may have data processing capability to collect and present vehicle data to the assist activation system controller, and the controller area network.

In an embodiment of the invention, the drive history data acquisition system 106a, 106b monitors vehicle operational parameters before a parking event include vehicle speed, location parameters including vehicle location information, and enablement status of the park assist system 200a, 200b.

Vehicle location information is transmitted from at least one location sensor on the vehicle, such as a Global Positioning System device shown 110a, 110b, 110c, 110d in FIGS. 1-4, providing vehicle location vehicle information in the form of, for example, latitude and longitude values indicative of the actual, current geographic position of the vehicle as the vehicle travels along the road, highway or through parking zones. Embodiments of the present invention are not unnecessarily limited to any particular type or configuration of global positioning system or to any particular location sensor, wherein the location sensor may be used to receive position, time, and speed data, and may be any location sensor that has come or may come in to existence to track a vehicle's location.

The location sensor 110a, 110b transmits vehicle location, heading data, and proximity to a parking zone to the drive history data acquisition system 106a, 106b and may also transmit parking zone information from the parking zone database 112a, 112b to the drive history data acquisition system 106a, 106b. The location sensor and parking zone database 112a, 112b may be integrated with the drive history data acquisition system 106a, 106b.

In an embodiment of the invention, after each parking event using the park assist system 200a, 200b or manual entry of a parking zone by a user, the drive history data acquisition system 106a, 106b stores the parking zone details in the parking zone database 112a, 112b, In an embodiment of the invention, at least one speed sensor 114a, 114b, such as a wheel speed sensor, senses vehicle speeds and transmits vehicle speed data to the drive history data acquisition system 106a, 106b as shown in FIGS. 1-4. The drive history data acquisition system 106a, 106b along with the speed sensor 114a, 114b and location sensor 110a, 110b communicate with the activation system controller 104a, 104b, or similar network entity, via wired or wireless communications.

During each parking event using the park assist system 200a, 200b, when the vehicle is at a desired and available location and the preconditions have been met, the park assist system 200a, 200b is activated, and the drive history data acquisition system 106a, 106b maintains a record or log of drive history data based on a plurality of drive history parameters by recording the drive history parameters including the location, speed, and drive history of the vehicle.

The drive history parameters may include, vehicle location parameters, default park assist system parameters including default speed control inputs created during the parking event at the specified location, default trailer backup steering control inputs created during the parking event at the specified location, and operator modified parameters that are created as a result of operator inputs that modify the default parameters during a park assist system driving maneuver to park a vehicle such as, such as, braking, acceleration, and deceleration inputs.

The recorded or logged drive history parameters are collected to form a speed control profile associated with a particular location and optionally, a specified operator. The drive history profiles are written into the drive history database 108a, 108b at the end of the park assist system parking event but not if the parking event is not completed. If the vehicle has previously parked using the park assist system at a particular location, and once again parks using the park assist system at the same location, and no changes are made to the previously stored drive history profile, then no new drive history profiles are created during the subsequent parking event. However, if during the subsequent parking event, the driver modified the default drive history profile, or the retrieved previously stored drive history profile for a specified location, and optionally, driver, then the modified drive history profile will be stored in the registry database 108a, 108b. Parking events are automatically logged and/or reported to the drive history database acquisition system 106a, 106b and stored in the drive history database 108a, 108b until a new type history profile is created and is overwritten by a new recorded parking event with driver modified parameters at the same location, and optionally by the same driver.

The drive history database 108a, 108b communicates with the drive history data acquisition system 106a, 106b. The drive history database 108a, 108b, is a computer readable memory device, including RAM, ROM, virtual memory, hard drive memory, electronic memory, or a database. The drive history database 108a, 108b, may also be an apparatus readable by a drive unit of a data processing system such as a Universal Serial Bus drive, a compact disk, a tape cartridge, a continuous loop-tape, or a smartcard) or both.

The drive history database stores data transmitted from, and received by, the drive history data acquisition system. In addition it typically stores software applications, instructions that are configured for the assist activation system controller 104a, 104b and the drive history data acquisition system 106a, 106b to perform steps associated with the functionality of the automatic parking system 100a, 100b discussed below with regard to FIGS. FIGS. 5, 6A, 6B, 7A, 7B for associating various drive history, speed and location parameters to each of one or more parking zones, and optionally, to each driver of the vehicle if the vehicle is configured for driver personalization.

In an embodiment of the invention, the activation system 102a, 102b, 102d includes a human machine interface 116a, 116b, 116d, shown in FIG. 4, including a display 118a, 118b in communication with the assist activation system controller 104a, 104b and the drive history data acquisition system 106a, 106b. The human machine interface 116a, 116b, 116d transmits and receives signals to and from the activation system controller and before and during a parking maneuver. The human machine interface communicates park assist system signals to the activation system and drive history data acquisition system before automatic parking system enablement and activation. The interface 116a, 116b, 116d transmits a signal enabling, or prompting the user with a reminder to enable, the park assist system; activating the park assist system to park when enabled; and when preconditions are met to activate or set the park assist system to park a vehicle in an available and desired location.

The interface is an electronic input device that is electronically connected to the vehicle and to the assist activation system controller. The interface may be connected to the vehicle through the CAN or through any other wired connection, such as a USB connector, or alternatively, may be wirelessly linked with the vehicle. The interface includes an input control mechanism and a visible display screen that may be incorporated into the vehicle. For example, the interface may utilize a control panel and display screen already within the vehicle, e.g., a navigation system or entertainment unit, or may be a separate device, such as a hand-held system electrically connected to the vehicle. The interface can include at least one communication interface or other means for transmitting and/or receiving data, content or the like, as well as at least one user interface that can include a display and/or a user input interface.

The user input interface, in turn, may include any of a number of devices allowing the entity to receive data from a user, such as a keypad, a touch display, a joystick, knob, slider device, physical buttons, virtual "touch screen" buttons, handheld electronic device such as a "smart phone", voice control inputs or other input device.

The visible display may comprise a video display element, an alphanumeric or iconistic display element or the like, and may comprise a display on demand type display element, a thin film transistor liquid crystal display element, a multipixel display element, and/or a multi-icon display element and/or the like. A combination of a visible and audible output may be used.

The activation system further includes a driver personalization module 120a, 120b communicating with the interface and the drive history data acquisition system whereby a user inputs personalization information. When a driver is specified using the driver personalization module 120a, driver information is sent to the drive history data acquisition system as a driver identification parameter that associates a specific drive history profile developed associated with the specified driver at a geographic location.

The activation system 102a, 102b includes a parking zone database 112a, 112b storing parking zone data. The parking zone database 112a, 112b may be located within the vehicle or a remote location that communicates wirelessly with the assist activation system 102a, 102b whereby predefined parking zones may be retrieved from a remote database of parking zones from a graphical information system such as street maps parking zone information. The parking zone database 112a, 112b may be updated by information regarding the attributes of parking zone zones within a user's region or along an intended route. The parking zone database is an up to date database of parking lots and spaces defining parking zones. A driver may be notified when the driver travels below a threshold speed and approaches a recognized parking zone, for example, park assist system has previously been activated.

In several embodiments of the invention, park assist system 200a, 200b automatically enables when in the proximity of a parking zone and when the vehicle is below the threshold speed or is first prompted for enabling by optional means such as visibly displaying the prompt to the driver on a display screen. An audible message may provide the prompt. For example, if a vehicle configured in accordance with the present invention enters/approaches a parking zone where there are predominantly perpendicular parking spaces the automatic parking system activates to park in a parking location where the system has been previously activated and use uses previously stored parking maneuver information, i.e., drive history profile, to park in the parking location.

The automatic parking system 100a-100d of the present invention is a system capable of automatically performing the parking of a vehicle wherein the same system is applied to all parking modes (for example, straight forward parking during perpendicular parking, backward parking during perpendicular parking, and parallel parking), but is not limited to a specific mode. If such vehicle enters/approaches a zone, such as a parking lot or garage where there are predominantly parallel parking spaces (i.e., a parallel parking configuration) as determined by the park assist system, when activated/set to park, the automatic parking system activates in a parallel parking mode.

When driven through a region where there are parking locations of various configuration (e.g., parallel parking configuration, perpendicular parking configuration) and/or unrecognized parking locations (e.g., private parking structures, parking structures not available in the parking zone database at a current time), as the vehicle gets within a defined proximity to such parking location(s), the automatic parking system toggles between parallel and perpendicular parking modes automatically, as appropriate.

The park assist system 200c shown in FIG. 3 communicates with the assist activation system 102c, a speed sensor 114c, a location sensor 110c, a powertrain system control module 216c, a brake system control module 214c, and a power steering assist system 208c including a power-steering assist control module 210c and a steering angle detection apparatus 212c to control vehicle parking maneuvers when the park assist system 200c is activated. The park assist system 200c communicates with an obstacle avoidance system to assist in detection of obstacles (not shown) during a parking maneuver.

As shown in FIG. 3, the park assist system 200c includes a park assist control module 202c in communication with the activation system controller 104c and with other vehicle system modules. The park assist control module 202c receives control signals from the activation system controller 104c to enable, activate and adaptively control the park assist control module 202c based on either default drive history data including vehicle speed and location, or previous drive history data including vehicle speed and vehicle location information.

The park assist control module 202c includes a microcomputer that electrically bi-directionally communicates with the assist activation system controller and with a plurality of vehicle system modules to automatically control speed of the vehicle during the park assist system parking maneuver at the geographic location based on the drive history profile associated with the geographic location. The drive history profile includes a default speed profile, a previously stored drive history profile associated with the geographic location, a driver modified speed profile that deviates from either the default speed profile or the previously stored drive history profile when a driver manually overrides an automatic speed control function.

FIG. 4 illustrates another embodiment of an automatic park system 100d that includes an activation system 102d having a controller 104d and a human machine interface 116d in communication with an automatic parking system, shown as a trailer backup assist 200d system for a vehicle 120d and trailer 122d, which are connected together to form a vehicle and trailer assembly. Activation system 102d, in communication with the trailer backup assist system 200d of the vehicle 120d, in further communication with other trailer backup system architecture systems and components, controls the vehicle speed and curvature of path of travel of the trailer 122d that is attached to the vehicle 120d during a parking maneuver based on either a default drive history profile or based on a previously stored drive history profile associated with a current location, and optionally, also associated with an identified driver.

In addition to being coupled to the activation system 102d, the trailer backup system 200d may be connected to a trailer backup steering input apparatus, at least one vehicle system such as the powertrain system, the steering system and/or the brake system to control and direct movement of the vehicle and trailer assembly. The trailer backup assist system 200d includes a trailer backup assist control module 202d, a trailer backup steering input apparatus 218d, shown as an input to the interface 116d in the activation system 102d, and a hitch angle detecting apparatus 204d. The trailer backup steering input apparatus is used as an interface through which a change in a desired trailer path curvature is inputted. The apparatus can be electrically coupled to the interface module, as shown in FIG. 4, or to another control module such as, but not limited to the trailer backup assist control module (not shown).

The trailer backup assist control module 202d is connected to the hitch angle detecting apparatus 204 for allowing communication of information there between and sends instructions to the vehicle systems to move the vehicle and trailer assembly along an intended backing path to a final space. The steering, braking, and other controls are calculated by the control module 202d based upon the intended backing path initially input by the vehicle operator to the interface 116d and transmitted to the control module 202d by the activation system controller 102d.

As shown in FIG. 4 backup control is accomplished through interaction of the activation system controller 104d in communication with the trailer back-up assist control module 202d and other systems and components of the trailer backup system architecture including, but not limited to: a power steering assist system 208d, a brake system, a powertrain system, each including a respective control module, power-steering assist control module 210d, steering angle detection apparatus 212d, wherein the steering angle detecting apparatus of the power-steering assist system 208d is connected to the power-steering assist control module 210d for providing information thereto, brake system control module 214d, and powertrain system control module 216d of the vehicle and the trailer backup assist system 200d.

The trailer backup assist control module 202d is configured for implementing logic (i.e., instructions) for receiving information from a trailer backup steering input apparatus 218d via the interface 116d, the hitch angle detecting apparatus 204d in communication with the hitch angle detecting component 206d, the power steering assist control module 210d, the brake system control module 214d, and the powertrain control module 216d.

When the trailer backup assist system 200d is activated, the trailer backup assist control module 202d (e.g., a trailer curvature algorithm thereof) generates vehicle steering information as a function of all or a portion of the information received from the hitch angle detecting apparatus 122d, the hitch angle detecting component 206d, the power-steering assist control module 210d, the brake system control module 214d, and the powertrain control module 216d, and the assist activation system controller 104d.

The trailer backup steering input apparatus 218d may be adjusted by a system user to override the trailer backup steering control and alter the curvature of the path of travel of the trailer 122d during a backup maneuver without aborting the automatic vehicle steering control operation of the trailer backup assist system during a parking maneuver. Additionally, the speed of the vehicle can be altered during a controlled backup maneuver when a driver manually accelerates or brakes to form a different speed profile than the default drive history speed profile when the vehicle has never used the trailer backup assist system at a specified parking space or backup location, or a different speed profile than a previously stored profile using the assist activation system 202d during a previous controlled backup maneuver at the current location or parking space.

The trailer backup system control module includes a microcomputer that bi-directionally communicates with the activation system controller 104d and with a plurality of vehicle system modules to automatically control speed of the vehicle and trailer backup steering control during the park assist system parking maneuver at the geographic location based on the drive history profile associated with the geographic location. Wherein the drive history profile includes: a default speed profile, a previously stored drive history profile associated with the geographic location, a driver modified speed profile that deviates from either the default speed profile or the previously stored drive history profile when a driver manually overrides an automatic speed control, a default trailer backup path profile, a previously stored trailer backup path profile, or a driver modified trailer backup path profile that deviates from either the default trailer backup path profile or the previously stored trailer backup path profile when a driver manually overrides the automatic trailer backup steering control.

A method 300 of using the automatic parking system 100a is shown in FIGS. 5, 6A, 6B, 7A, and 7B.

Figure 5:
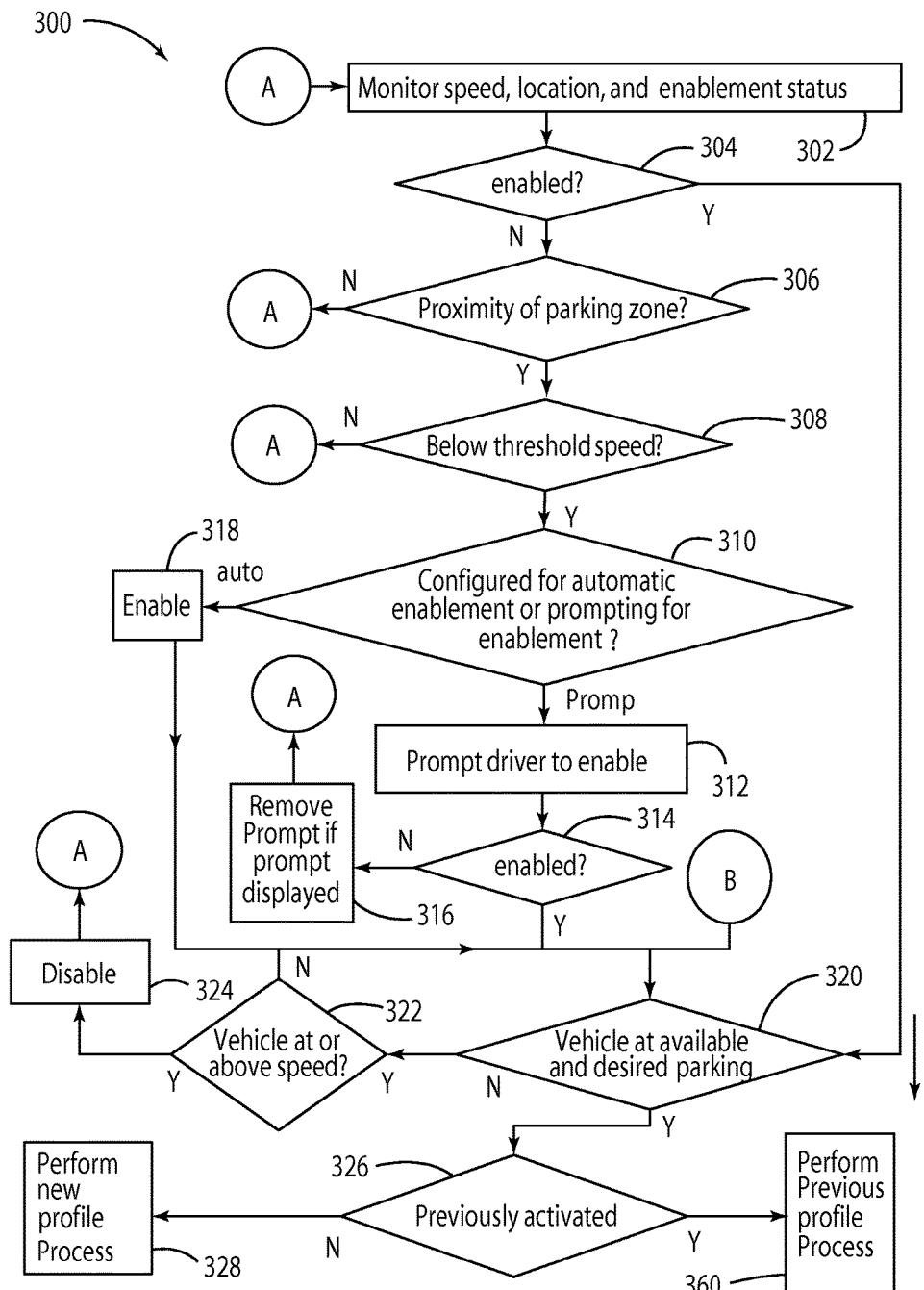
FIG. 5 is a flowchart of a method of activating and adaptively controlling an automatic parking system.

Referring in more detail to the method 300 shown in FIG. 5, starting at the point A the activation system 102a monitors vehicle speed, location, and enablement status of the park assist system, step 302, when the vehicle is moving and makes a determination whether the park assist system is enabled, step 304.

If the park assist system is not enabled, then a determination is made whether the vehicle is in proximity of a parking zone, step 306. If the park assist system has not been enabled, and the vehicle is not in the proximity of a parking zone, or if the parking zone has not been specified in the parking zone database or if no parking zone information is available to the assist activation system, then the activation system returns to point A and continues to monitor vehicle speed, location, and enablement status of the park assist system, step 302, until enabled or until the vehicle is in the proximity of a parking zone.

If the park assist system is not enabled, but the vehicle is in proximity of a parking zone, then a determination is made whether the vehicle is operating below a threshold speed, step 308, defined by the operational parameters of the park assist system, wherein the park assist system cannot be activated if the vehicle is operating at or above the threshold speed. If the park assist system is not enabled, and if the vehicle is in the proximity of a parking zone, but the vehicle is not operating below the threshold speed, then the system returns to point A and continues monitoring vehicle speed, location, and enablement status of the park assist system, step 302, because the park assist system 200a may not be enabled when the vehicle is operating at or above the threshold speed.

If the park assist system is not enabled, if the vehicle is both in the proximity of a parking zone, and if the vehicle is operating below the threshold speed and thus, the park assist system is capable of being enabled, then, depending on the system configuration, park assist system is automatically enabled or before park assist system is enabled, a user is given a prompt to enable park assist system, step 310.

As the vehicle approaches each new parking zone and reaches a speed below a threshold speed, the system uses intelligent vehicle control adaptation and a geographically based parking zone database, to enable the park assist system and the activation system and their respective controllers to cooperate to slow down or speed up the vehicle to recreate a previous parking maneuver completed with the park assist system and automatically stay within previous speed profiles in each parking zone during a current parking maneuver if the driver does not modify the previous speed or trailer steering profiles. If the driver modifies the speed or trailer steering profiles during the current parking maneuver, then the driver modified speed profile is stored in the drive history database and is used to control the speed of the vehicle during the next subsequent parking maneuver at the same location.

If the system is configured to automatically enable park assist system, the system is automatically enabled when the vehicle is in the proximity of a parking zone and is below a threshold speed, step 318. In an embodiment of the invention having the automatic enablement configuration, when the system is enabled, the driver may be reminded or alerted that park assist system is now enabled through any available alert means that exists or that may come into existence, such as an audible or visual alert. Thus, in the automatic enablement configuration, the system automatically enables upon meeting the required location and speed conditions. An enabled system will not park at the available parking space until the park assist system is additionally activated to perform a parking maneuver upon meeting preconditions for parking as discussed in more detail below.

When in a proximity of a parking zone and operating below a threshold speed, if the system is configured for prompting of the park assist system enablement, then a user is prompted to enable the system, step 312. Often, users will forget that they have a park assist system and will manually park without enabling and activating the system. If prompted to use the park assist system when the location and speed conditions are met, the user will be reminded of the availability and will be more likely to use the system in a parking or backup maneuver. The prompt may be displayed on the interface display. However, any type of prompting me offer the parking assist system enablement option to the driver, such as other visual or audible means.

Next, a determination is made whether parking assist system has been enabled, step 314, i.e., selected by a system user. If the user declines to select the enable park assist system after a predefined time after prompting or selects to not enable the park assist system, then the system returns to monitoring vehicle speed, location, and enablement status, step 302. If the display prompts the user and the user declines the prompt is removed, step 316, before returning to point A and resuming monitoring vehicle speed, location, and enablement status, step 302.

If the parking assist system has been initially enabled, step 304; if the vehicle is in the proximity of a parking zone and is below a threshold speed and the driver has prompted the assist activation system to enable the park assist system, steps 312, 314, or if parking assist system has been enabled automatically, step 318, when the vehicle is in the proximity of a parking zone and is below a threshold speed, then a determination is made whether the vehicle is at an available and desirable parking space, step 320. If the vehicle is not at an available and desirable parking space, then a determination is made whether the vehicle speed is at or above the threshold speed, step 322. If the vehicle is at or above the threshold speed, then, park assist system is disabled, step 322 and the system returns to point A and continues to monitor vehicle speed, location, and enablement status of the system, step 302.

If the vehicle speed is not at or above the threshold speed, then the system continues to monitor the parking zone for available and desirable parking spaces until the user decides to stop looking for a parking space and drives away from the space, thereby operating the vehicle at a speed that is at or above the threshold speed, or until an available and desirable parking space is detected.

Once an available and desirable parking space is detected, the system determines whether park assist system has been previously activated at this location, step 326. If the system has not been previously activated at this location, then the system performs a new park assist system drive history profile process, step 328, shown in greater detail in FIGS. 6A-6B and discussed in more detail below.

If the park assist system has been previously activated at this location, then the system performs a previous park assist system drive history profile process, step 360, shown in greater detail in FIGS. 7A-7B and discussed in more detail below.

If the vehicle is at or above the threshold speed, then a park assist system parking maneuver cannot occur. For example, a vehicle with an automatic park system that is traveling at or above the threshold speed, may no longer desire to park in the available location and may continue to drive away from the available parking space.

Figure 6A:
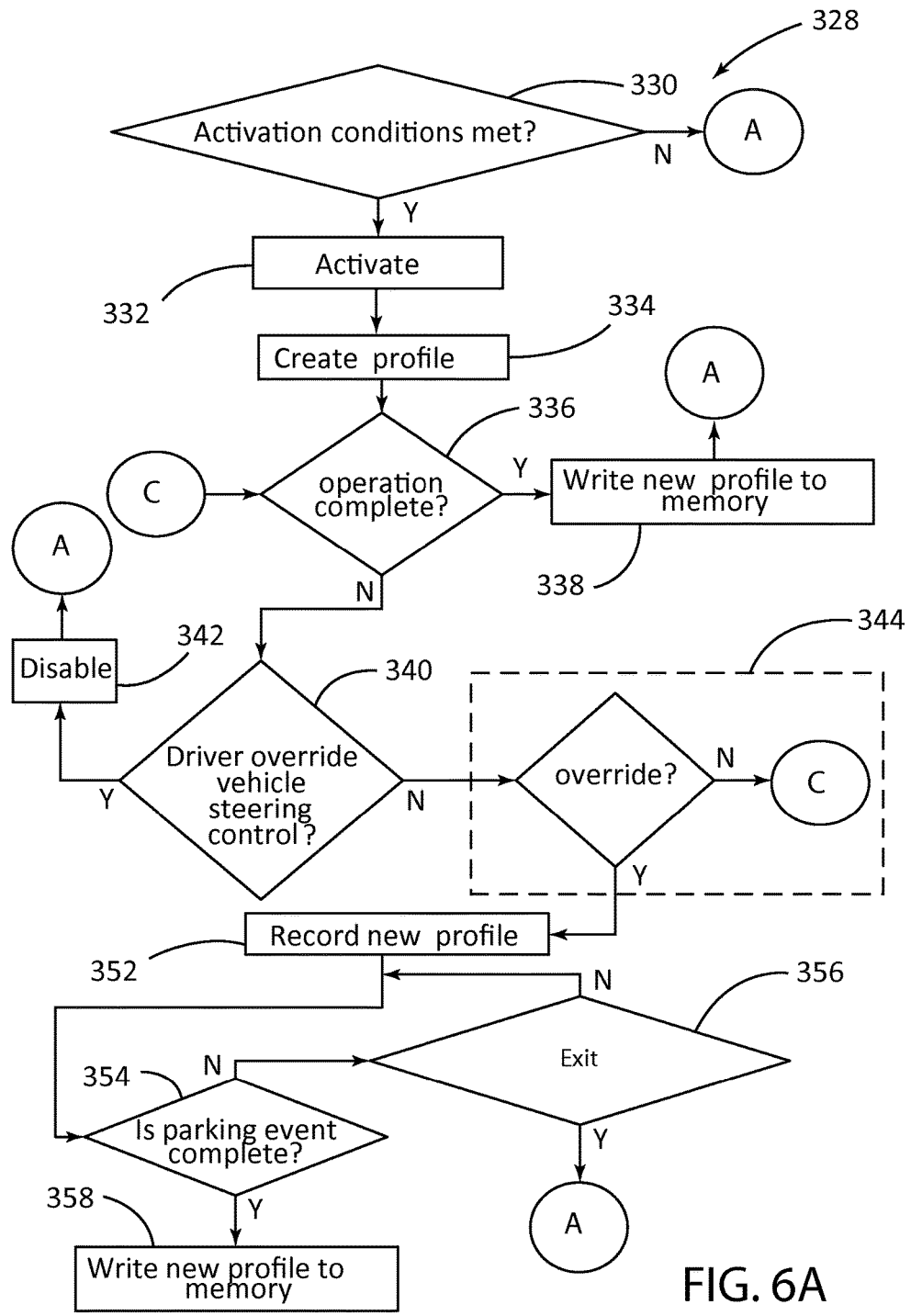
FIG. 6A is a flowchart of the method of using the automatic parking system shown FIG. 5 including the process of performing a parking maneuver at a location where the park assist system has never before been activated.
Figure 6B:
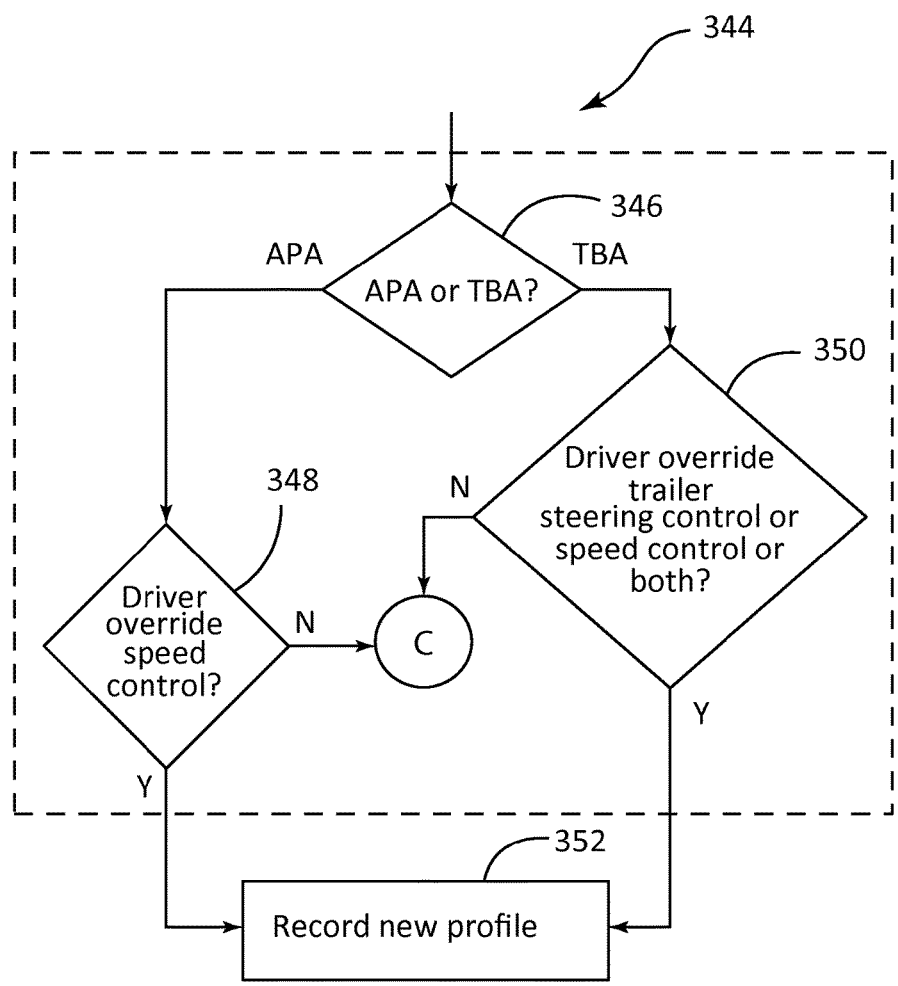
FIG. 6B is a more detailed flowchart of the process of FIG. 6A including the step of determining, based on a specific system configuration selected from an automatic park assist system or a trailer backup assist system, whether the park assist system has been overridden by driver inputs.

FIGS. 6A-6B illustrate a park assist system drive history profile process, step 328. As shown in the flowchart in FIG. 6A, first a determination whether the preconditions for activation of system have been met, step 330. The preconditions for activation of the park assist system vary according to the configuration of a specific system implemented in the vehicle, including the vehicle speed being below the threshold speed, and other preconditions for parking maneuver control as is well-known with park assist systems.

If the preconditions for activation of system have not been met, then the system returns to point A and continues monitoring the vehicle speed, location, and enablement status of the system, step 302 shown in FIG. 5.

If all activation conditions are met, and the driver desires to park in an available parking space where the park assist system has not previously been activated to park the vehicle, then the assist activation system controller sends a command signal to activate the park assist system, step 332. Once activated, a new drive history profile is created, step 334, to maneuver the vehicle in a parked position using default drive history parameters. A determination is made whether the park assist system operation is complete, step 336. If so, a new drive history profile is stored in the drive history database 338 and the system returns to point A and continues monitoring vehicle speed, location, and enablement status of the park assist system, step 302 shown in FIG. 5.

If the park assist system operation is not complete, then a determination is made whether the driver has overridden the vehicle steering control, step 340, thereby interrupting the parking maneuver. If the driver has overridden the vehicle steering control by adjusting the steering wheel, then the park assist system is disabled, step 342, and the system returns to point A and resumes monitoring the vehicle speed, location, and enablement status of the system, step 302 shown in FIG. 5. If the driver overrides the park assist system controlled parking maneuver, then a modified drive history profile with the parameters recorded during the overriding parking maneuver are recorded by the drive history data acquisition system, step 352.

If the driver has not overridden vehicle steering control, then a process, step 344, determines whether additional park assist system control has been overridden based on the type of system implemented in the vehicle. As shown in more detail in FIG. 6B, system override decisions vary in accordance with the specific automatic parking system implemented in the vehicle. If an automatic park assist (APA) system is implemented in the vehicle, such as, but not limited to the system 100c shown in FIG. 3, then the system can be overridden during a parking maneuver if the driver intervenes and changes the vehicle speed by manually accelerating or braking to a different speed than the default drive history speed parameters. A decision is made whether the driver has overridden the speed control, step 348. If the driver has not overridden the speed control the system returns to point C and determines if the park assist system operation is complete, step 336 shown in FIG. 6A.

If the driver has overridden the speed control, then the drive history data acquisition system records the new modified drive history profile, step 352 in FIGS. 6A, 6B, now modified from the default drive history profile by the driver's speed control inputs.

If a trailer backup assist system (TBA) is implemented in the vehicle, then the backup assist system can be overridden during a parking maneuver if the driver intervenes and changes the vehicle speed by manually accelerating or braking to a different speed than the default drive history speed parameters, if the driver overrides the trailer backup steering control by manually adjusting the trailer backup steering input apparatus to a different position than determined by the drive history trailer backup steering parameters during a trailer backup parking maneuver, thereby changings the path of the trailer to a different path, or if the driver changes both the vehicle speed and the trailer backup steering control during a trailer backup maneuver.

In an embodiment of the invention, where the park assist system implemented in the vehicle is a trailer backup assist, a decision is made whether the driver has overridden the speed control, trailer backup steering control, or both, step 350. If the driver has not overridden the speed or trailer backup steering control, then once again the system returns to point C and determines if the park assist system operation is complete, step 336 until the driver overrides the controlled parking maneuver or until the operation is complete as shown in FIG. 6A.

If the driver has overridden the trailer backup assist speed control, trailer backup steering control, or both, then the drive history data acquisition system records the new modified drive history profile, step 352 in FIGS. 6A, 6B, modified from the default drive history profile by either the driver's control of the vehicle speed or by the driver adjusting the trailer backup steering input apparatus, or both. Referring once again to FIG. 6A, if the park assist system operation is complete and the driver has not overridden the default control, then the vehicle is in its final parked position and the newly created default drive history profile is written or stored in the drive history database 108a, and the system resumes monitoring the vehicle speed, location, and enablement status of the system, step 302 shown in FIG. 5.

Next, a determination is made whether the parking event is complete, step 354. If the parking event is not complete, then a determination is made whether to exit the parking maneuver, step 356. A decision to exit the parking maneuver can be made manually by a system user or automatically by the system due to an invalid condition that occurs or to any other condition criteria used to exit a controlled parking maneuver. If the decision is made not to exit the parking maneuver, then once again, the system monitors the parking event until either the parking event is complete or until the vehicle exits the parking maneuver, step 354.

If the vehicle exits the parking maneuver, then the system returns to point A and continues monitoring vehicle speed, location, and enablement status of the park assist system, step 302 shown in FIG. 5.

If the parking event is complete, then the new drive history profile with the driver modified drive history parameters is written to the drive history data acquisition system database memory and overwrites the default drive history profile, step 358, and the system returns to point A and continues monitoring vehicle speed, location, and enablement status of the system, step 302 shown in FIG. 5

Figure 7A:
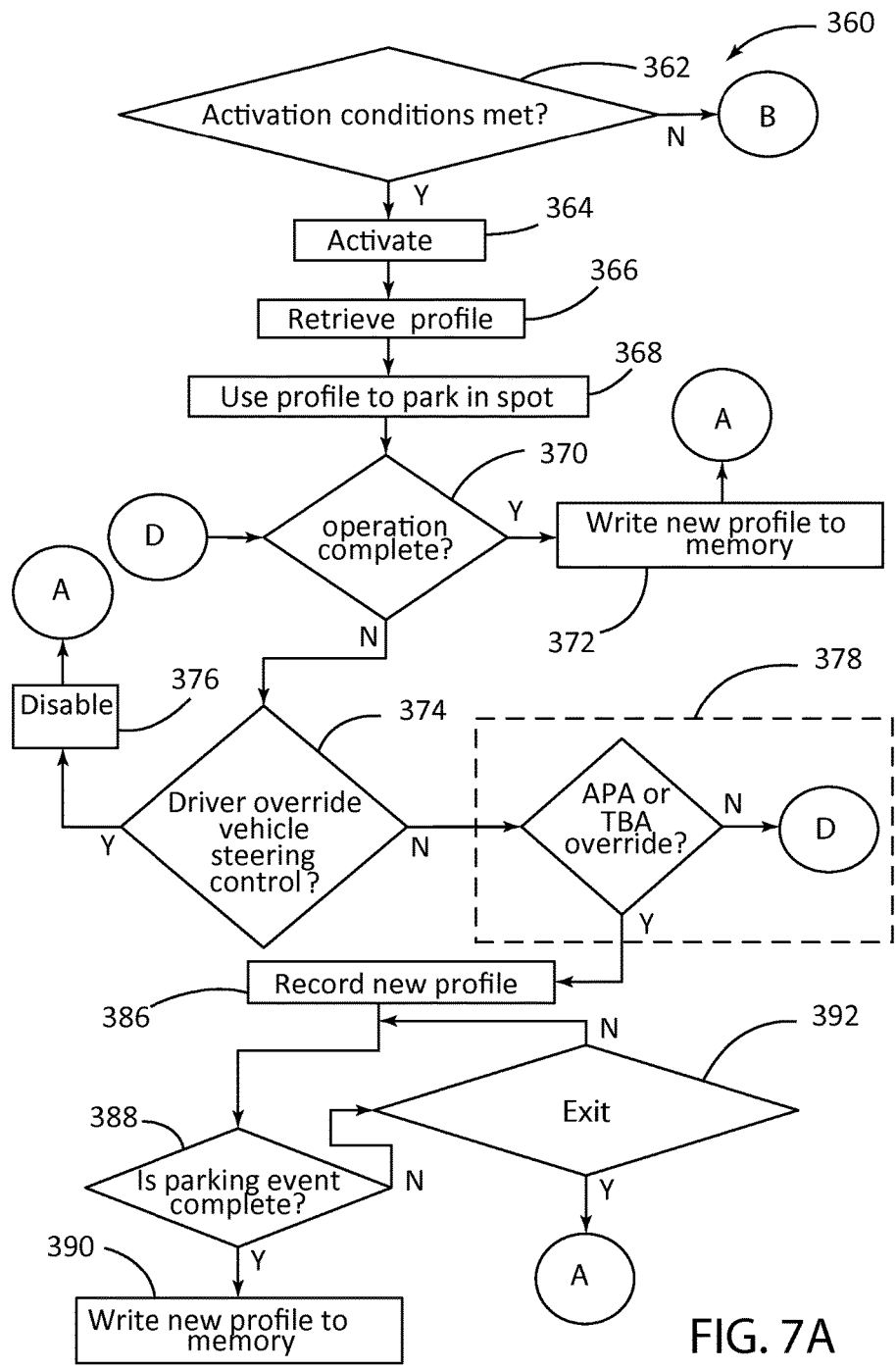
FIG. 7A is a flowchart of a more detailed process of the method of using the automatic parking system shown FIG. 4 including the step of performing a parking maneuver at a location where the park assist system has previously been activated to park a vehicle.
Figure 7B:
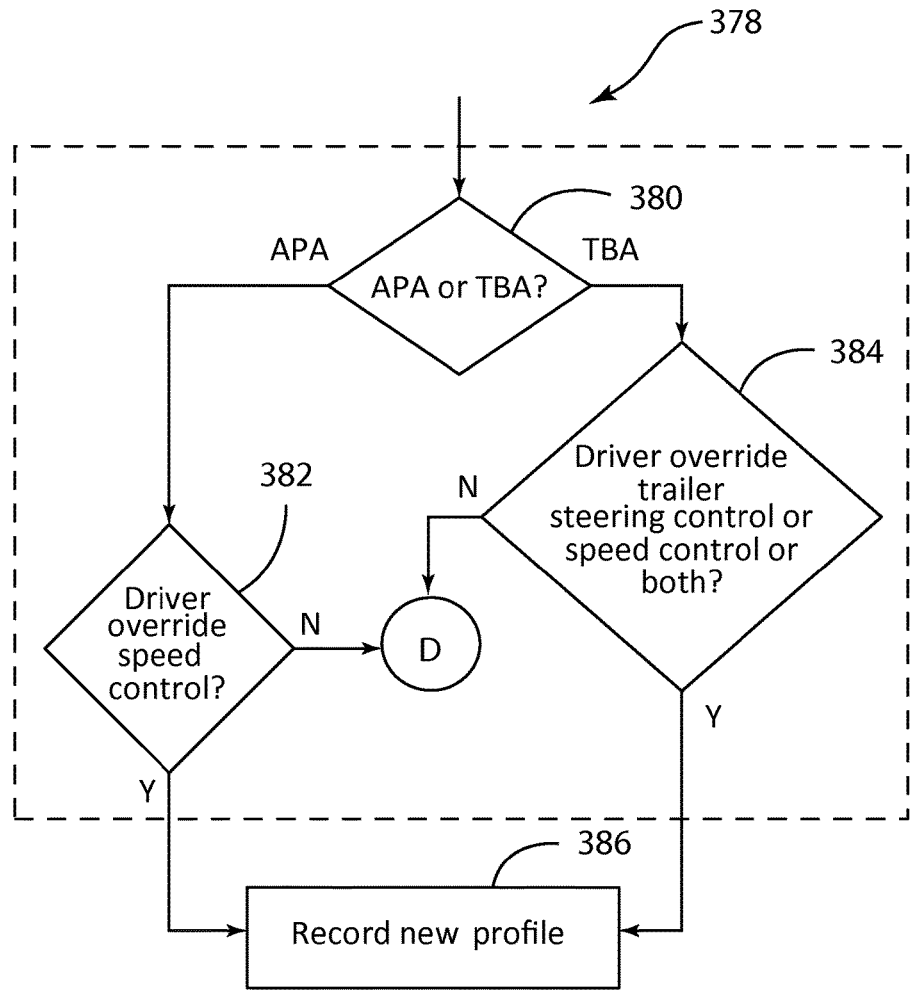
FIG. 7B is a more detailed flowchart of the process of FIG. 7A including the step of determining, based on a specific automatic parking system selected from an automatic park assist system or a trailer backup assist system, whether the park assist system has been overridden by driver inputs.

The park assist system drive history profile process, step 360 disclosed in FIG. 5 is shown in more detail in FIGS. 7A-7B. If all system activation conditions are met, step 362, such as but not limited to the vehicle speed still below the threshold speed and other preconditions for steering control have been met wherein such conditions will vary according to the specific system being implemented in the vehicle, and the driver desires to park in an available parking space where system has previously been activated to park the vehicle, then the assist activation system controller sends a command signal to activate park assist system, step 364. Once activated, the drive history profile previously stored during the last park assist system controlled parking maneuver at this location is retrieved, step 366, and is used by system to control the vehicle during the current parking maneuver in the current parking space according to the retrieved drive history profile, step 368. A determination is made whether the park assist system operation is complete, step 370. If complete, then the vehicle was parked using the retrieved drive history profile and the system returns to point A and continues monitoring vehicle speed, location, and enablement status of the park assist system, step 302 shown in FIG. 5.

If the operation is not complete, then a determination is made whether the driver has overridden the park assist system vehicle steering control, step 374, thereby interrupting the parking maneuver. If the driver has overridden the vehicle steering control by adjusting the steering wheel, then the park assist system is disabled, step 376 and the system returns to point A and resumes monitoring the vehicle speed, location, and enablement status of the park assist system, step 302 shown in FIG. 5.

If the driver has not overridden the park assist system vehicle steering control, then a process, step 378, determines whether additional park assist system control has been overridden depending on the type of park assist system implemented in the vehicle.

The process, step 378, is shown in more detail in FIG. 7B, wherein system override decisions vary in accordance with the specific parking assist system implemented in the vehicle. FIG. 7B, illustrates the step 380 of determining t the type of park assist system; i.e. an automatic park assist (APA) or a trailer backup assist (TBA).

If an automatic park assist system is implemented in the vehicle, then the system can be overridden during a parking maneuver if the driver intervenes and changes the vehicle speed by manually accelerating or braking to a different speed than the retrieved drive history speed parameters. Where the park assist system implemented in the vehicle is an automatic park assist, a decision is made whether the driver has overridden the speed control, step 382. If the driver has not overridden the speed control, then once again, the system returns to point D and determines if the park assist system operation is complete, step 370, shown in FIG. 7A. If the driver has overridden the speed control, then the drive history data acquisition system records the new modified drive history profile, step 386 in FIGS. 7A, 7B, now modified from the retrieved drive history developed by profile by the driver's speed control inputs.

If a trailer backup assist system is implemented in the vehicle, then the system can be overridden during a parking maneuver if the driver intervenes and changes the vehicle speed by manually accelerating or braking to a different speed than the retrieved drive history speed parameters, if the driver overrides the trailer backup steering control by manually adjusting the trailer backup steering input apparatus to a different position than the previous trailer backup steering parameters during a current trailer backup parking maneuver, thereby changing the path of the trailer to a different path, or if the driver changes both the vehicle speed and the trailer backup steering control during a trailer backup maneuver.

Where the park assist system implemented in the vehicle is a trailer backup assist system, a decision is made whether the driver has overridden the speed control, trailer backup steering control, or both, step 384. If the driver has not overridden the speed or trailer backup, then once again, the system returns to point D and determines if the park assist system operation is complete, step 370 shown in FIG. 7A.

If the driver has overridden the trailer backup assist speed control, trailer backup steering control, or both, then the drive history data acquisition system records the new driver modified drive history profile, step 386 in FIGS. 7A, 7B, now modified from the retrieved profile by either the driver's control of the vehicle speed or by the driver adjusting the trailer backup steering input apparatus, or both.

Referring once again to FIG. 7A, a determination is made whether the parking event is complete, step 388. If the park assist system operation is complete, step 388, and the driver has not overridden the park assist system control, then the vehicle is in its final parked position and the retrieved previous drive history profile remains stored in the drive history database 108*a*, step 390, and the system returns to point A and resumes monitoring the vehicle speed, location, and enablement status of the park assist system, step 302 shown in FIG. 5.

If the parking event is not complete, then a determination is made whether to exit the parking maneuver, step 392. A decision to exit the parking maneuver can be made manually by a system user or automatically by the system due to an invalid condition that occurs or to any other condition criteria used by an automatic park assist or trailer backup assist system to exit a controlled parking maneuver. If the decision is made not to exit the parking maneuver, then once again, the system determines if the parking event is complete, step 388, until either the parking event is complete or until the vehicle exits the parking maneuver.

If the vehicle exits the parking maneuver, then the system returns to point A and continues monitoring vehicle speed, location, and enablement status of the park assist system, step 302 shown in FIG. 5. If the parking event is complete, then the new modified drive history profile with the driver modified parameters is written to the drive history database memory and overwrites the retrieved drive history profile, step 390, and then the system returns to point A and continues monitoring vehicle speed, location, and enablement status of the park assist system, step 302 shown in FIG. 5.

In still another example, the inventive subject matter is implemented logically in a distributed manner whereby a plurality of control units, control modules, computers, or the like (e.g., an electronic control system) jointly carry out operations for providing activation system and park assist system functionality.

In another example, activation system and park assist system functionality is implemented within a standalone controller unit of an electronic control system of a vehicle that provides activation system functionality as well as one or more other types of park assist system control functionality of a vehicle such as, but not limited to brake system functionality, powertrain system functionality, and steering assist functionality.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A parking system used with a vehicle comprising:
   a park assist system, said park assist system operative to perform a parking maneuver at a geographic location; and
   an activation system, including an activation system controller including a microcomputer in communication with the park assist system, wherein said activation system activates and controls the park assist system during the parking maneuver at the geographic location based on a drive history profile associated with the geographic location;
   wherein the park assist system is a trailer backup assist system having a control module including a trailer backup assist microcomputer that bi-directionally communicates with the activation system controller and with a plurality of vehicle system modules to control the vehicle speed and trailer backup steering control during the parking maneuver at the geographic location based on the drive history profile associated with the geographic location; and
   said drive history profile including a default speed profile, a previously stored drive history profile associated with the geographic location, a driver modified speed profile that deviates from either the default speed profile or the previously stored drive history profile when a driver manually overrides a speed control function of the trailer backup assist system, a default trailer backup path profile, a previously stored trailer backup path profile, or a driver modified trailer backup path profile that deviates from either the default trailer backup path profile or the previously stored trailer backup path profile when the driver manually overrides the trailer backup steering control.

2. A parking system used with a vehicle comprising:
a park assist system, said park assist system operative to perform a parking maneuver at a geographic location;
an activation system, including an activation system controller including a microcomputer in communication with the park assist system, wherein said activation system activates and controls the park assist system during the parking maneuver at the geographic location based on a drive history profile associated with the geographic location;
a location sensor detecting location information of the vehicle;
a speed sensor detecting speed of the vehicle;
a drive history data acquisition system that records vehicle input parameters measured during the parking maneuver including drive history data based on the location data sensed from the location sensor and speed data from the speed sensor; and
a non-transitory drive history database that stores a recorded drive history profile transmitted from the drive history data acquisition system when the parking maneuver has been completed.

3. The parking system as set forth in claim 2, wherein the drive history data acquisition system records a modified drive history profile when the driver overrides automatic operation of the park assist system during the parking maneuver at the geographic location.

4. The parking system as set forth in claim 3, wherein the drive history data acquisition system stores the modified drive history profile in the drive history database when the parking maneuver is completed.

5. The parking system as set forth in claim 4, wherein the stored modified drive history profile overwrites a previous drive history profile stored in the drive history database during a previous park assist system parking maneuver at the geographic location.

6. The parking system as set forth in claim 3, wherein the recorded modified drive history profile is not stored in the drive history database if the parking maneuver is not completed.

7. A parking system used with a vehicle comprising:
an active park assist system: and
an activation system, including an activation system controller including a microcomputer, wherein said activation system activates and controls the active park assist system during a parking maneuver at a geographic location based on a drive history profile associated with the geographic location;
wherein the active park assist system includes a control module including an active park assist microcomputer that bi-directionally communicates with the activation system controller and with a plurality of vehicle system modules to operatively perform a parking maneuver at the geographic location by controlling the vehicle speed during the parking maneuver at the geographic location based on the drive history profile associated with the geographic location; and
wherein said drive history profile includes a default speed profile, a previously stored drive history profile associated with the geographic location or a driver modified speed profile that deviates from either the default speed profile or the previously stored drive history profile when a driver manually overrides a speed control function of the active park assist system.

8. The parking system as set forth in claim 7, further including:
a data acquisition system in bidirectional communication with the activation system controller that receives vehicle location inputs from a vehicle location sensor, vehicle speed inputs from a vehicle speed sensor, and park assist system enablement status inputs from the active park assist system control module before a parking event to determine whether to enable the active park assist system.

9. The parking system as set forth in claim 8, wherein the activation system controller automatically enables the active park assist system when the vehicle is within a predefined distance from the geographic location and is operating below a threshold speed, wherein if the vehicle speed is at or above the threshold speed, the active park assist system cannot be enabled.

10. The parking system as set forth in claim 9, wherein the activation system includes a human machine interface having a display in communication with the activation system controller and with the drive history data acquisition system, wherein the human machine interface receives inputs from the driver, and transmits and receives signals to and from both the activation system controller and the active park assist system control module before and during a parking maneuver.

11. The parking system as set forth in claim 10, further including a driver personalization module configured to enable a user to input driver personalization information, including inputting driver identification information into the human machine interface display, wherein the driver identification information is sent to the drive history data acquisition system as a driver identification parameter that associates the drive history profile with the identified driver information during an active park assist system parking maneuver at the geographic location.

12. The parking system as set forth in claim 9, wherein the activation system controller configures the human machine interface to prompt the driver to enable the park assist system when the vehicle is in a predefined proximity of the geographic location and when a speed of the vehicle drops below a predefined threshold speed.

13. The parking system as set forth in claim 7, wherein the active park assist system was previously activated at the geographic location.

14. A method of using a parking system in a vehicle comprising the steps of:
using a park assist system to assist in parking a vehicle during a parking maneuver at a geographic location;
activating the park assist system at the geographic location based on a drive history profile associated with the geographic location; and
controlling the vehicle speed during the parking maneuver at the geographic location based on the drive history profile associated with the geographic location.

15. The method of claim 14, further including the steps of:
recording a plurality of vehicle input parameters via a drive history data acquisition system, said vehicle input parameters measured during the parking maneuver and including drive history data based on vehicle location data, vehicle speed data, and park assist system data of operational vehicle parameters;
forming the drive history profile based on the recorded vehicle input parameters; and
storing the drive history profile in a non-transitory drive history database when the parking maneuver has been completed.

16. The method of claim 15, further including the step of recording a modified drive history profile when a driver overrides operation of the park assist system during the parking maneuver at the geographic location.

17. The method of claim 16, further including the steps of:
    storing the modified drive history profile in the drive history database when the parking maneuver is completed; and
    preventing storage of the modified drive history profile in the drive history database if the parking maneuver is not completed.

18. The method of claim 15, further including the step of overwriting a previous drive history profile stored in the drive history database during a previous park assist system parking maneuver at the geographic location with the stored modified drive history profile.

* * * * *